July 30, 1935.  A. J. MOTTLAU  2,009,964
UNIDIRECTIONAL END THRUST BEARING
Filed March 16, 1932
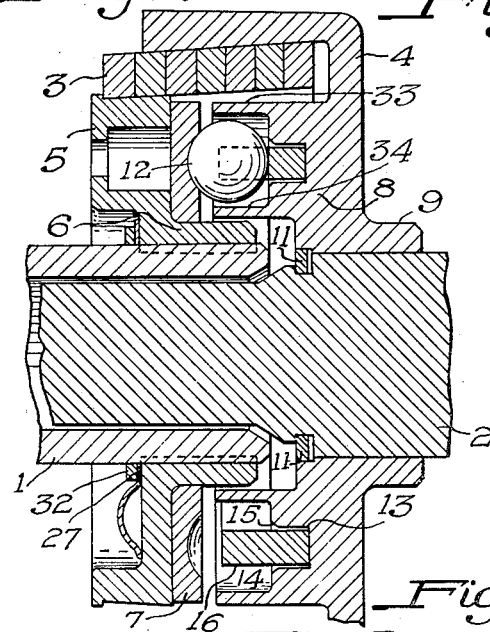
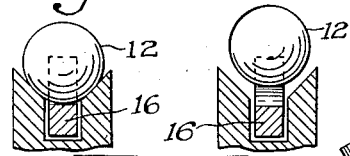
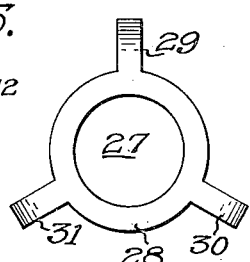
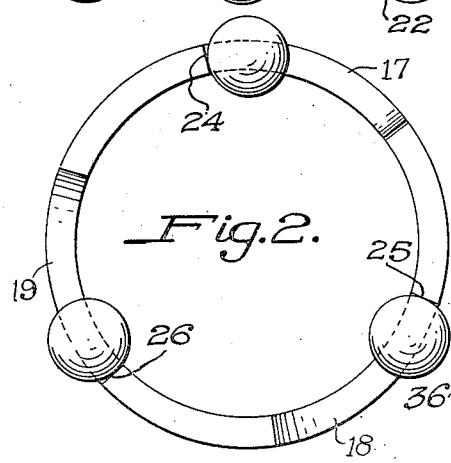
INVENTOR
August J. Mottlau
by
his attorney Patented July 30, 1935

2,009,964

UNITED STATES PATENT OFFICE 2,009,964

UNI-DIRECTIONAL END-THRUST BEARING

August J. Mottlau, Pittsburgh, Pa., assignor, by mesne assignments, to Julius E. Foster, Pittsburgh, Pa.

Application March 16, 1932, Serial No. 599,172

17 Claims. (Cl. 192—45)

This invention relates to bearings.

One object of this invention is to provide a ball or roller bearing that will rotate freely as a bearing in one direction only, and that will function as a cam in the opposite direction of rotation.

Another object of this invention is to provide a ball bearing that will function freely as a bearing in one direction, and, immediately upon a tendency of rotation in the opposite direction, will respond to such reversal of rotation as a detection of substantial synchronism between the two races of the bearing when the races are both rotatably mounted.

Another object of the invention is to provide a combination bearing and synchronism detector, for use between two coaxially aligned shafts or rotating members, which shall function to detect a condition of synchronism between the two shafts or rotating members, and which shall provide a mechanical movement that may be utilized to connect two shafts or rotatable members, or to perform any other appropriate action that may be desired.

In my co-pending application Serial No. 599,171, filed Mar. 16, 1932, relating to Clutch system, I have disclosed a clutch system for selectively connecting or disconnecting two co-axially aligned shafts which are independently, or may be independently, rotatable. The clutch system disclosed in my co-pending application is intended to function as a free-wheeling device when selectively adjusted to do so by the operator of the automotive vehicle in which it is disposed. When a bi-directional or direct drive connection is to be established, however, it is desirable that such connection be established with a minimum shock to the mechanism, which could best be done at the time when the drive shaft and the driven shaft are rotating at substantially synchronous speeds.

In order to control the connection of the two shafts in accordance with the condition of synchronism existing between the two shafts, I have provided a combination ball bearing and synchronism detector which is arranged to function normally as an end-thrust ball bearing so long as there is a difference in the speeds of rotation of the two shafts in a predetermined direction. As soon as the slower shaft is accelerated to the point where both shafts are running at the same speed and are in substantial synchronism, the parts of the bearing are naturally relatively stationary. As soon as the previously slower shaft begins to accelerate but slightly faster than the speed of the other shaft, however, a movable separator cam functions as a cam to provide one or more inclined surfaces upon which the balls roll up and force the two ball bearing races apart. This separating or relative movement between the two races is then utilized to operate a desired control member, or to move one clutch member into co-operative relation, or engagement, with another clutch member. Since such engaging relationship is established while the two shafts are substantially in synchronism, or very slightly different in speed, no shock is imposed upon any part of the system by a transfer of energy from one shaft to the other through the clutch at such time.

The present application is a continuation in part of my co-pending application, referred to above, and is directed to the construction of the combination bearing and synchronism detector.

In the present application I have shown two modifications whereby synchronizing control action of the bearing may be utilized to operate a control member, in one direction or in the other, axially along the shaft.

I have also illustrated herein, different constructions for supporting the balls between the two races, during operation.

The different modifications referred to are illustrated in the accompanying drawing, in which Figure 1 is a side sectional view of a ball bearing and synchronism detector as applied to control two co-operating clutch elements associated with two co-axially aligned shafts;

Figure 2 is a front elevational view of the synchronizing ring with the three bearing balls in position;

Figure 3 is a side elevational view of the ring in Figure 2;

Figure 4 is a sectional view through the bearing showing the rollers adjacent the low point of a cam surface of the synchronizer ring;

Figure 5 is a sectional view of the bearing showing the roller on the high point of the inclined cam surface of the synchronizer ring;

Figure 6 is a side sectional view of a modified form of bearing arranged to function in the reverse direction of that shown in Figure 1;

Figure 7 is a front elevational view of a modified form of synchronizer ring provided with individual cages for each ball for maintaining the ball in its predetermined path of travel;

Figure 8 is a side elevational view of one section of the ring showing the disposition of the individual cage adjacent each ball;

Figure 9 is a sectional view of a bearing provided with a synchronizer ring having such a cage as in Figure 8, taken through one of the cages to show its curved construction for retaining the ball in place; and Figure 10 is an elevation view of a biassing spring washer for the bearing.

As shown in Figure 1 two rotatable shafts or rotatable members are co-axially aligned, and, for the purpose of explaining the devices in this application, may be referred to as drive shaft 1 and driven shaft 2, although each shaft may be independently operable and rotatable without depending upon the other shaft for energy. Where it is desired to connect two such shafts or members, however, it is desirable to connect them with a minimum shock to the shafts or to the mechanism connected thereto, which necessitates that such connections be made when the shafts are rotating or moving at relatively synchronous speeds.

Two clutch elements 3 and 4 are illustrated, the clutch element 3 consisting of a helically wound spring of sufficient strength to be substantially strong and rigid. One end of the spring is secured in any suitable manner to an annular supporting ring 5 that constitutes part of and is integral with the splined sleeve 6 that is axially movable on the drive shaft 1 but cannot rotate relative to the drive shaft. The splined sleeve 6 also serves to support an annular ring 7 that constitutes one race of a combination ball bearing and synchronism detector. The other race 8 is illustrated as being part of, and integral with, a sleeve 9 that is fixedly secured to the driven shaft 2 and is held in proper position against axial movement by a key or snap ring 11.

The clutch element 4 that co-operates with the spring 3 is illustrated as consisting of a tapered sleeve that is integral with the annular flange of which the part 8 constitutes a race for the bearing.

The two races 7 and 8 are thus supported on the drive shaft 1 and the driven shaft 2, respectively, so that they are free to move with respect to each other. Three balls 12 are supported between the races 7 and 8 as anti-friction elements. The race 8 is provided with a concentric channel 13 whose side walls are bevelled at the edges to provide two spaced raceways 14 and 15 for the balls 12 during the operation of the two races and the balls as an end-thrust ball bearing.

A synchronizer ring 16 is provided to rotate freely in the channel or slot 13 in response to the rotational or revolving movement of the balls during the ball bearing operation. The synchronizer ring 16 is provided with three tapered recesses presenting three inclined cam surfaces 17, 18 and 19 that extend from a low zone 21 in each case to a high zone 22. The low zone 21 of each inclined cam surface is below the lowest point of the balls 12 when the balls ride upon the raceways 14 and 15 of the race 8. The high point 22 extends laterally away from the face of the race 8 and towards the race 7 so that when the balls roll up onto the cam surfaces 17, 18 and 19 they move the race 7 axially away from the race 8 and simultaneously force the annular supporting ring 5 with its clutch element 3 into engagement with the clutch element 4, thereby connecting the drive shaft 1 and the driven shaft 2.

When the drive shaft 1 rotates more slowly than the driven shaft 2, as during familiar freewheeling operation, the race 8 moves in advance of the race 7 in such direction as to cause the balls 12 to press against the rear end walls 24, 25 and 26 at the inclined cam surfaces 17, 18 and 19, respectively, in the synchronizer ring. Since there is no pressure on the synchronizer ring except such tangential pressure of the balls against those end wall surfaces, the synchronizer ring is free to turn, and does turn in the channel shaped recess 13 in the race 8, in response to the propelling movement of the balls as they roll around between the races. During such rotation of the balls, they rest on the bevelled edges or raceways 14 and 15 of the race 8 but do not engage the low zone or any part of the inclined cam surfaces 17, 18 and 19 on the synchronizer ring, but are free to rotate as parts of an end-thrust ball bearing. During such operation the synchronizer ring serves merely as a spacer or separator for the balls.

When the drive shaft 1 is accelerated to a speed that is the same as that of the driven shaft 2, the balls 12 and the two races 7 and 8 gradually slow down and become relatively stationary at synchronous speed. As soon as drive shaft 1 advances but slightly ahead of the driven shaft 2, the rollers 12 are caused to move in a direction opposite to that in which they moved during the ball bearing operation. They now roll up onto the inclined cam surfaces 17, 18 and 19, and as a consequence, force the race 7 and the annular supporting ring 5 in a direction away from the race 8 axially along the drive shaft 1. The extent of such separating movement depends upon the length and inclination of the inclined cam surfaces 17, 18 and 19. Such axial movement of the annular supporting ring 5 is then utilized to place the helical clutching spring 3 in clutching engagement with the sleeve 4, thereby establishing direct mechanical connection between the drive shaft 1 and the driven shaft 2 without shock, due to the relatively synchronous speeds of the two shafts.

The separation of the two races by means of the balls rolling up onto the inclined cam surfaces of the synchronizer ring is established against a counteracting biassing force of a spring washer 27 embodying an annular ring body 28 and three radial resilient bent fingers or prongs 29, 30 and 31. The ring body 28 is braced or held in position by a limit or stop ring 32 on the drive shaft 1. The three resilient fingers or prongs 29, 30 and 31 rest against the outer surface of the annular supporting ring 5 which carries the helical spring clutch member 3. During normal ball bearing operation of the bearing, the spring washer 27 functions to press the two races 7 and 8 together into engagement with the balls 12 so that the entire unit functions as an end-thrust ball bearing with the pressure of the biassing spring 27 as the end-thrust force. During the reversing operaton that causes the balls to force the race 7 outward, however, the biassing force of this spring is overcome.

In order to retain the balls in operative position against the centrifugal forces tending to move the balls radially, I have provided several different arrangements that permit the balls to function normally, while at the same time preventing them from moving excessively in a radial direction due to centrifugal forces.

As shown in Figure 1, I provide two retainer rings 33 and 34 concentrically disposed on the race 8. The rings are preferably mounted to provide a small space between their inner surfaces and the balls during normal ball bearing operation in order to avoid or limit any rubbing action between the balls and the rings.

The rings 33 and 34 may be integral parts of the flange plate in which the race 8 is formed, and shaped during the machining of the race, or they may be separate elements properly assembled in position on the race 8. In view of their function, they may obviously be supported on either race.

In Figures 7 and 8 I have illustrated another construction whereby the balls may be retained in proper operating positions. In that construction, curved ball-retainer cage walls 36 and 37 are mounted on the synchronizer ring 16 alongside each recess in the ring. The two cage walls are inclined at an angle corresponding to the angle of inclination of the cam surfaces 17, 18 and 19 and the cage walls are also curved to correspond to the curvature of the balls and also to correspond to the curvature of the synchronizer ring 16. The ends of the cage walls are secured in position on the rings by any suitable means such as small rivets 38. This construction permits the balls to be assembled in position on the synchronizer ring, so that the entire assembly may be handled as a unit during manufacturing or replacement. The balls are always thus held in proper operating positions.

In Figure 6, I have illustrated another modification of a combination end-thrust bearing and synchronizer, embodying the principles of this invention, but arranged to move the clutch elements towards each other, instead of away from each other, as it is done in the modification shown in Figure 1.

In the construction shown in Figure 6, two clutch elements 50 and 51 are respectively supported on the drive shaft 1 and on the driven shaft 2, by means of flanged supporting rings 40 and 41, respectively. The clutch supporting ring 40 is splined on the drive shaft 1 so that it may move axially on the drive shaft 1 but not rotate thereon. The supporting ring 41 is secured in position to the driven shaft 2 against both axial and rotational movement. The supporting ring 40 for the clutch element on the drive shaft 1 is integral with and secured to a splined sleeve 42 which provides the mechanical connection between the supporting ring 40 and the drive shaft 1. The sleeve 42 also carries with it an annular ring 43 that constitutes one race of the end-thrust bearing. The race 43 is secured to the sleeve 42 in any suitable manner as by means of pins or bolts 44. The other race 45 of the bearing is supported in proper position by means of a ring 48 having an annular flange 53 by means of which the ring is mounted upon and secured to the annular supporting ring 41 for the clutch element 51 on the driven shaft 2. The race 45 is secured to and supported on the ring 48 by means of pins or bolts 46 and the ring 48 is secured and supported on the flanged supporting ring 41 by means of bolts 49.

The race 45 is relatively stationary in so far as axial movement is concerned, due to its being supported on the annular ring 41 which is anchored in position on the driven shaft 2. The race 43 is relatively axially movable with respect to the race 45 depending upon the direction of rotation of the drive shaft 1 with respect to the driven shaft 2. When the driven shaft 2 is rotating in advance of the drive shaft 1, the bearing functions as an end-thrust ball bearing and the balls roll freely between the two races in the manner described in connection with the previous modification shown in Figure 1. In the reverse direction of operation the balls roll up on to the inclined cam surfaces of the synchronizer ring and force the two races apart, as was previously described. Such separating action of the races in the present construction, however, moves the annular supporting rings 40 and 41 with their associated clutch elements 50 and 51 towards each other, instead of away from each other, as was the case in the construction shown in Figure 1. The movable race 43 is biassed toward the other race 45 by means of a spring washer similar to that described in Figure 1. The space 47 adjacent the inner surface of the supporting ring 41 is provided to accommodate the clutch element 50 in its inward motion.

By means of the construction of the synchronizer ring as illustrated, with each inclined cam surface occupying an arc or angle of approximately 60 degrees, it will be apparent that the clutch action between the two shafts is established within 1/6 of a revolution difference in speed between them. Clutching action so established does not cause any shocks to the system including the two shafts, since they are substantially in synchronism at the time. During periods of relative rotation, when the two shafts are free to rotate relatively without mechanical connection between them, the bearing functions merely as an end-thrust bearing, and there is no undue or non-symmetrical wear on any of the parts.

Since the various elements of the bearing and of the parts controlled by the bearings may be disposed or located according to the direction of relative movement desired, and since the individual construction of the parts of the bearing may be arranged to suit different conditions, it will be apparent that my invention is not limited to the specific details of construction that are illustrated, since they may be variously modified without departing from the spirit and scope of the invention as set forth in the appended claims.

I claim as my invention:

1. A ball bearing comprising two annular races, balls between them and functioning with the races to constitute a ball bearing, and means responsive to rotation of the balls in one direction for permitting the balls and the races to function as a bearing, and responsive to rotation of the balls in the opposite direction to separate the races from normal bearing space relation.

2. A direction-responsive end thrust bearing comprising two races co-axially aligned and relatively movable axially, and provided with concentric annular rolling surfaces a plurality of balls between the races, and engaging both races normally for free rolling movement between them, means biassing the races towards each other into engagement with the balls, and means responsive to the direction of rotation of the balls for either permitting the biassing means to be effective, or for overcoming the effect of the biassing means and separating the races.

3. A direction-responsive end thrust bearing comprising two annular races co-axially aligned and relatively movable axially, a plurality of balls between the races, means biassing the races towards each other into engagement with the balls to function as a ball bearing, and an element freely movable with the balls and responsive to the direction of rotation of the balls for either permitting the biassing means to be effective, or overcoming the effect of the biassing means and separating the races.

4. A direction-responsive end thrust bearing comprising two annular races co-axially aligned and relatively movable axially, a plurality of balls between the races, means biassing the races towards each other into engagement with the balls to function as a ball bearing, and a ring associated with one race and serving as a separator for the balls and freely movable on said race with the balls to permit ball bearing action in one direction of rotation of the balls, said ring having an inclined surface adjacent each ball to force the balls away from said one race and to move the other race axially also from said one race when the balls move in the opposite direction of rotation.

5. An end thrust bearing comprising two annular races co-axially aligned and relatively movable axially, a plurality of balls between the races and functioning as a ball bearing with the races, a concentric annular slot in one race flanked by two shoulders arranged to constitute a raceway for the balls during rotation of the balls in one direction, and a ring extending into and seated in the slot and concentrically rotatable in said slot, said ring being shaped to embody an inclined edge adjacent each ball, each inclined edge extending from a low zone below the bottom point of each ball to a zone above the raceway of the two shoulders.

6. The combination with two rotatable members, of means between them constituting an end thrust bearing in only one direction of relative rotation, said means comprising an annular race on one rotatable member, an annular race on the second rotatable member, one of said races being fixed on its member and the other race being axially movable on its member, a plurality of balls freely rotatable between the annular races through a complete circular path, resilient means biassing the races toward each other, and means responsive to the direction of relative rotation of the two rotatable members for permitting the two annular races and the balls to function as a bearing in the predetermined one direction of relative rotation, and for separating the two races in the opposite direction of relative rotation.

7. A combination end-thrust bearing and synchronism detector for use on two rotatable co-axially aligned members, comprising two co-axially aligned annular races having continuous raceways and respectively supported on the rotatable members with balls between the races and freely rotatable as a ball bearing, the two races being axially movable relative to each other but fixed against rotary motion relative to the respective rotatable members upon which they are supported, one of the races having a concentric channel or slot in its face with the corner edges of the walls bevelled to provide a runway for the balls, and a ring in the channel and movable therein in response to movement of the balls in one direction, said ring having an inclined surface adjacent each ball with the bottom zone of the inclined surface below the locus of the bottom of the balls when they ride on the runway.

8. A combination bearing and synchronism detector comprising two co-axial relatively rotatable annular races, a plurality of balls between the races and freely rotatable in and through a circular path, means for biassing the races together, and a traveling ring in one race, serving as a separator for the balls and actuated by the balls in one direction of rotation, said ring having a cam surface adjacent each ball upon which the ball rides when rolling in a reverse direction and operates to separate the races.

9. A combination bearing and synchronism detector comprising two co-axial relatively rotatable annular races, a plurality of balls between the races and freely rotatable in and through a circular path, means for biassing the races together, and means responsive to relative rotation of the races in one direction for permitting the balls to roll between both races as a ball bearing and responsive to relative rotation or a tendency towards relative rotation in the opposite direction for moving the balls away from one race.

10. A uni-directional end-thrust bearing comprising two annular races disposed to face each other in co-axial relation, anti-friction elements between the races, means movable with the anti-friction elements to permit them to roll freely between the races in a complete annular path in one direction of rotation but to prevent free rolling of the elements between the races in the opposite direction of rotation, and means associated with said movable means for preventing radial displacement of the anti-friction elements in response to centrifugal forces.

11. A uni-directional end-thrust bearing comprising two annular races disposed to face each other in co-axial relation, anti-friction elements between the races, means movable with the anti-friction elements to permit them to roll freely between the races in a complete annular path in one direction of rotation but to prevent free rolling of the elements between the races in the opposite direction of rotation, and means normally biassing the races and the anti-friction elements together but permitting axial separation of the races when free rolling is prevented.

12. A ball bearing comprising two annular races, balls between them and functioning with the races to constitute a ball bearing, means responsive to rotation of the balls in one direction for permitting the balls and the races to function as a bearing, and responsive to rotation of the balls in the opposite direction to separate the races from normal bearing space relation, and means for preventing undue radial movement of the balls in response to centrifugal force when the races are so separated.

13. A ball bearing comprising two annular races, balls between them and functioning with the races to constitute a ball bearing, means responsive to rotation of the balls in one direction for permitting the balls and the races to function as a bearing, and responsive to rotation of the balls in the opposite direction to separate the races from normal bearing space relation, and means for retaining the balls in the locus of their circular path against centrifugal force, when the races are so separated.

14. An actuator comprising two co-axial annular members relatively movable with rotary and axial motion, a biassing spring to press them together, and a floating wedge cam ring and roller assembly capable of rotary and axial motion and operative in one direction only for counter-balancing the biassing spring.

15. An actuator comprising two co-axial annular members relatively movable with rotary and axial motion, a biassing spring to press them together, and a floating wedge cam ring and roller assembly capable of rotary and axial motion and operative in one direction only for counter-balancing the biassing spring and separating the annular members.

16. An actuator comprising two annular members co-axially disposed and relatively movable with rotary and reciprocating axial motion, a biassing spring to press and bias said members together, and means for counter-balancing the biassing spring and moving the annular members axially, said means including a floating wedge cam and a co-operating rolling element, and operative in one direction only to overcome the biassing spring.

17. An actuator comprising two annular members co-axially disposed and relatively movable with rotary and reciprocating axial motion, a biassing spring to press and bias said members together, and means for counter-balancing the biassing spring and moving the annular members axially in one direction only, said means including a floating wedge cam and co-operating rolling elements, and means independent of the annular members for retaining the rolling elements in a predetermined path against centrifugal force developed during rotation.

AUGUST J. MOTTLAU.